(12) United States Patent
Santosuosso et al.

(10) Patent No.: US 10,795,734 B2
(45) Date of Patent: Oct. 6, 2020

(54) PROCESSING ELEMENT RESTART PRECEDENCE IN A JOB OVERLAY ENVIRONMENT

(71) Applicant: International Business Machines Corporation, Armonk, NY (US)

(72) Inventors: John M. Santosuosso, Rochester, MN (US); Jason A. Nikolai, Rochester, MN (US); David M. Koster, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 187 days.

(21) Appl. No.: 16/016,440

(22) Filed: Jun. 22, 2018

(65) Prior Publication Data
US 2019/0391852 A1    Dec. 26, 2019

(51) Int. Cl.
*G06F 9/46* (2006.01)
*G06F 9/50* (2006.01)
*G06F 9/48* (2006.01)

(52) U.S. Cl.
CPC .......... *G06F 9/5083* (2013.01); *G06F 9/4881* (2013.01)

(58) Field of Classification Search
None
See application file for complete search history.

(56) References Cited

U.S. PATENT DOCUMENTS

| 8,112,541 | B2  | 2/2012  | Amini et al. |
| 9,069,543 | B2  | 6/2015  | Branson et al. |
| 9,253,058 | B2  | 2/2016  | Branson et al. |
| 9,747,000 | B2  | 8/2017  | Chan et al. |
| 10,025,827 | B1* | 7/2018 | Fawcett ................ G06F 9/5027 |
| 2007/0261041 | A1 | 11/2007 | Amini et al. |

(Continued)

OTHER PUBLICATIONS

Hirzel, Martin et al., "SPL: An Extensible Language for Distributed Stream Processing", ACM Transactions on Programming Languages and Systems (TOPLAS) Homepage archive, vol. 39, No. 1, Article 5, http://hirzels.com/martin/papers/toplas17-spl.pdf, Mar. 2017.

(Continued)

*Primary Examiner* — Gregory A Kessler
(74) *Attorney, Agent, or Firm* — North Shore Patents, P.C.; Michele Liu Baillie

(57) ABSTRACT

Embodiments generally relate to processing element restart precedence in a job overlay environment. In some embodiments, a method includes determining a job overlay, wherein the job overlay involves updates to a subset of processing elements of a plurality of processing elements of a job. The method further includes determining processing requirements of the plurality of processing elements. The method further includes determining computation capabilities of computational resources associated with the plurality of processing elements. The method further includes determining a processing element restart order based at least in part on processing requirements and computation capabilities. The method further includes updating the subset of processing elements. The method further includes restarting the subset of processing elements based at least in part on the processing element restart order.

17 Claims, 4 Drawing Sheets

(56) References Cited

U.S. PATENT DOCUMENTS

2017/0223075 A1    8/2017  Hong et al.

OTHER PUBLICATIONS

Orso, Alessandro et al., "A Technique for Dynamic Updating of Java Software", IEEE International Conference on Software Maintenance, https://homes.cs.washington.edu/~anuprao/pubs/icsm02_dusc.pdf, Feb. 2002.

Wolf, Bernard et al., "A Dynamic OSGi-based Data Stream System", MDS '08 Proceedings of the 5th Middleware doctoral symposium, pp. 31-36, Dec. 1, 2008.

* cited by examiner

PROCESSING ELEMENT RESTART PRECEDENCE IN A JOB OVERLAY ENVIRONMENT

BACKGROUND

Stream computing enables organizations to process data streams, which continuously provide data. A system includes process elements that connect to various data sources and continuously analyze data. Process elements often need to be changed due to needed updates. If changes to the process elements are required, those process elements are taken offline. Those process elements are then restarted after changes are made. This is disruptive to the processing of the data streams, and data loss may occur when offline processing elements are not available, which is detrimental to the overall functioning of stream computing applications.

SUMMARY

Disclosed herein is a method for operating process elements in a job overlay environment, and system and computer program product as specified in the independent claims. Embodiments are given in the dependent claims. Embodiments can be freely combined with each other if they are not mutually exclusive.

In an embodiment, a method includes determining a job overlay, wherein the job overlay involves updates to a subset of processing elements of a plurality processing elements of a job. The method further includes determining processing requirements of the plurality processing elements. The method further includes determining computation capabilities of computational resources associated with the plurality of processing elements. The method further includes determining a processing element restart order based at least in part on processing requirements and computation capabilities. The method further includes updating the subset of processing elements. The method further includes restarting the subset of processing elements based at least in part on the processing element restart order.

In another embodiment, the determining of the processing element restart order is based at least in part on historical performance metrics. In another aspect, the determining of the processing element restart order is based at least in part on historical decisions. In another aspect, the at least one processor further performs operations comprising dropping data based at least in part on a number of buffered tuples exceeding a buffer threshold. In another aspect, the at least one processor further performs operations comprising restarting at least some of the processing elements of the subset of processing elements simultaneously based at least in part on the processing element restart order. In another aspect, the method further includes buffering one or more tuples of one or more process elements before dropping data. In another aspect, the processing elements, which are not a part of the subset of processing elements that are updated, remain in operation during the updating and restarting.

DETAILED DESCRIPTION

Embodiments described herein facilitate the updating of process elements in a job overlay environment. Embodiments provide processing element restart precedence in dynamic distributed computing environments. As described in more detail herein, embodiments provide functionality that enables job overlays, where process elements of an application are updated, added, or removed, while a job associated with the application remains running.

In some embodiments, a system determines a job overlay, wherein the job overlay involves updates to a subset of processing elements of a plurality processing elements of a job. The system determines processing requirements of the processing elements and determines computation capabilities of computational resources associated with the processing elements. The system then determines a processing element restart order based at least in part on processing requirements and computation capabilities. The system updates the subset of processing elements, and then restarts the subset of processing elements based at least in part on the processing element restart order.

Figure 1:
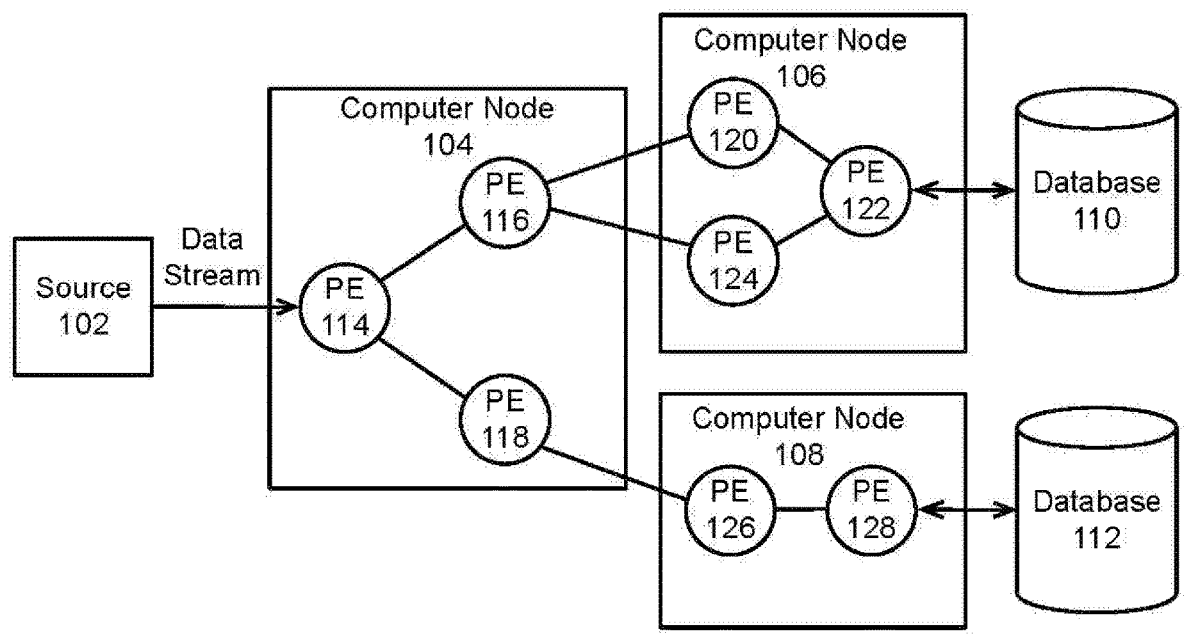
FIG. 1 is a block diagram of an example stream computing environment with processing elements, according to some embodiments.

FIG. 1 is a block diagram of an example stream-computing environment 100 with processing elements, according to some embodiments. Shown is a source 102, which provides a data stream to computer nodes 104, 106, and 108, which provide outputs to databases 110 and 112. As shown, computer node 104 includes processing elements (PEs) 114, 116, and 118. Computer node 106 includes PEs 120, 122, and 124. Computer node 108 includes PEs 126 and 128. Computer nodes 104-108 may be local or remote, depending on the particular implementation.

PEs 114-128 of respective computer nodes 104-108 process streams of data, where computer nodes 104-108 constitute a distributed computing environment. Source 102 may provide any type of data such as data from the Internet, hypertext transfer protocol (HTTP) calls, reads from databases, reads from file systems, sensor data, etc.

A PE is a process containing one or more operators. Each operator is a functional piece of code that acts on data, and usually written to deploy applications to a stream platform. Multiple PEs and their associated operators may be combined or fused into a single PE. A single PE may be separated or unfused into multiple PEs and associated operators. The PEs and associated operators may be a part of a programming language for stream computing, such as streams processing language (SPL). In some embodiments, a stream application may provide views to users, where a view is a stream concept where a sampling of data is taken from an operator for displaying in the user console, a spreadsheet, or via an application programming interface (API).

PEs 114-128 are distributed among computer nodes 104-108 in order to enable stream computing applications to take advantage of all hardware resources of computer nodes 104-108. In various embodiments, computer nodes 104-108 are configured to separate the processes of receiving the data stream, storing data from the data steam, accessing the data, manipulating or using the data, and sending data to databases 110 and 112. While particular lines are shown connecting particular PEs, any given PE may connect to any number of other PEs, depending on the particular implementation.

In operation, a given PE such as PE 114 or group of PEs may receive a data stream. After PE 114 handles or processes the data of the data stream, PE 114 sends the results to other PEs such as PE 116, PE 118, etc. The results of PE 116 get passed (down stream) to other PEs such as PE 120 and 124, and so on until a final PE such as PE 122 sends results or output to database 110. Similarly, the results from PE 118 get passed through other PEs, and results or output get sent to database 112. Various PEs involved in a particular job may be associated with the same computer node or distributed among multiple computer nodes, as shown.

Embodiments described herein provide functionality that enables a job to be overlayed. A job is the running of a compiled stream application that consists of a collection of operators written by an application developer. For example, a bundle file consisting of stream code may be submitted to the runtime environment. In various embodiments, a job remains running while a subset of PEs are taken offline for updating. The job also remains running while some PEs are removed or new PEs are added. As such, PEs that have changed are restarted while PEs that have not changed remain running. Moreover, PEs that are removed indefinitely are not restarted, and new PEs that are to be started are deployed. A runtime overlay involves placing a new job over an existing job during runtime.

Such job overlays are important because they minimize the amount of time a job is not functioning properly. This is of high value in cloud computing environments, where there are applications running where downtime needs to be minimized or avoided entirely. In a true real-time environment, it is not sufficient to merely hold unprocessed data in buffers waiting for processing elements to recover. Doing so can be advantageous in some environments, but it is not an end all solution. Operations of a job overlay are described in more detail herein.

For ease of illustration, FIG. 1 shows one block for source 102, three blocks for computer nodes 104, 106, and 108, eight blocks for PEs 114-128, and two blocks for databases 110 and 112. These blocks may represent any number of sources, computer nodes systems, PEs, and databases. For example, there may be multiple sources of incoming data streams that are received by computer node 104 and/or received by computer nodes 106 and 108. In another example, there may be hundreds or thousands of PEs in a given stream application. In other implementations, environment 100 may not have all of the components shown and/or may have other elements including other types of elements instead of, or in addition to, those shown herein.

Figure 2:
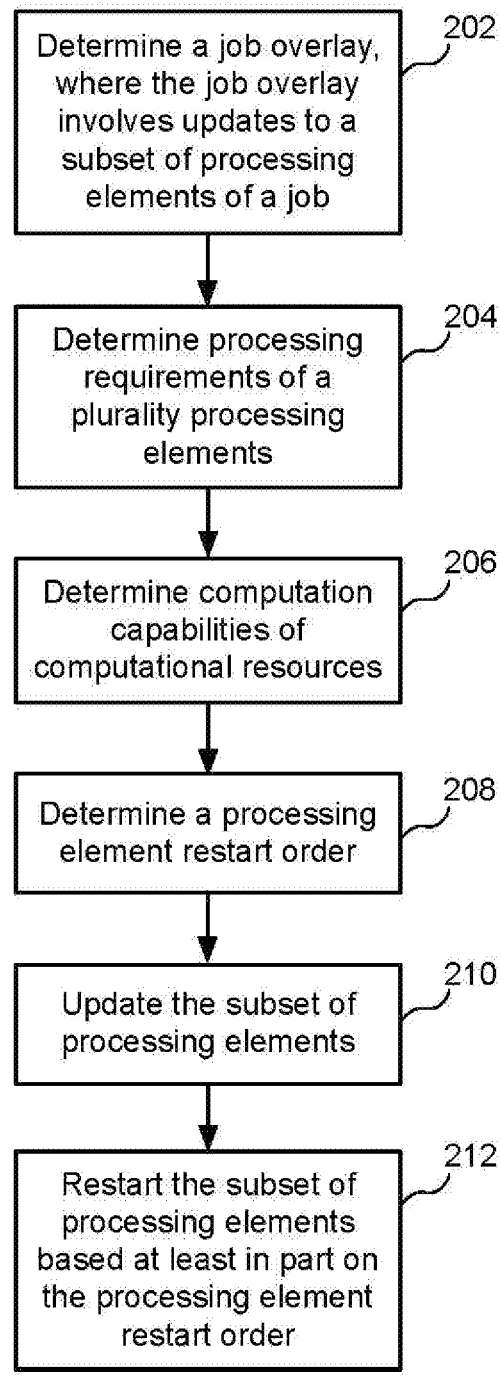
FIG. 2 is an example flow diagram for operating process elements in a job overlay environment, according to some embodiments.

FIG. 2 is an example flow diagram for operating process elements in a job overlay environment, according to some embodiments. Referring to both FIGS. 1 and 2, a method begins at block 202, where a system determines a job overlay, where the job overlay involves updates to a subset of processing elements of a job. For example, referring to FIG. 1, a job overlay may involve PEs 120, 122, and 124 being updated. The following examples presume that these PEs are being updated. In other scenarios, any other combination of PEs may be updated. In various embodiments, the system may determine which PEs are to be updated in multiple ways. In a first example, the code being deployed may be compared in that the system may automatically determine which PEs are to be updated by looking at which pieces of code have differences within the compilation units. In as second example, the system may receive from an end programmer specific PEs to be updated and redeployed.

At block 204, the system determines processing requirements of the processing elements. In various embodiments, the processing requirements are known in advance based at least in part on the software code. For example, process requirements may include required data rates, etc. In some embodiments, accompanying a piece of code to be deployed may be based on statistics and associated metrics. For example, such statistics may be gathered and maintained over time and associated with different PEs such that the system knows what is required for a given PE. In various embodiments, these metrics may include: 1) memory requirements; 2) computer processing unit (CPU) requirements; 3) disk read and write response time requirements; 4) data rates (e.g., how many tuples processes per a predetermined time metric, etc.), etc. In some embodiments, esoteric metrics may include whether the PE needs a dedicated CPU, whether the PE perform better with an accelerator such as an field programmable gate array (FPGA), etc. The particular metrics may vary, depending on the particular implementation. For example, metrics may further include whether the PE makes an unusual amount of system calls such that the system may determine to isolate the PE.

At block 206, the system determines computation capabilities of computational resources associated with the processing elements. In various embodiments, the system determines the processing element restart order based at least in part on historical performance metrics. For example, in some implementations, the system may determine one or more performance metrics such as system busyness, average response times, the length of time a particular operator of a PE takes to restart. Performance metrics may also include whether a particular operator of a PE being restarted is the slowest element of the operator graph. In various embodiments, the difference between an operator and a PE is that a PE is a container and can actually and often does contain more than one operator. Operators are fused together to become one PE. A PE is essentially one linux process and operators are fused together to avoid sending data unnecessarily between processes. Performance metrics may also include if a particular operator of a PE in question is associated with congestion. In a more specific example, if a particular computer node is busy 95% of the time during runtime, the system may cause data to be sent to a different PE and in a restart particular order. Performance metrics may also include the number of operators within each PE, the number of PEs, the number of total processing elements being submitted, and the number of connections each PE makes with other PEs. Performance metrics may also include the number of dynamic connections each PE makes. In some embodiments, a dynamic connection is a connection where PE need not connect to another PE, but the PE would require bookkeeping.

In some embodiments, performance metrics may include computer node metrics such as computer processing unit (CPU) speeds, disk rates (e.g., read-write rates, latency, etc.), memory capacity, memory usage, etc.

In various embodiments, the system determines the processing element restart order based at least in part on historical decisions. For example, a PE '5' may be started first, because the programmer knows that the output from PE '4' is needed in order to make PE '5' work properly. So, in essence, the system wants PE '5' up and running before PE '4' so as to insure that when PE '4' starts its data reaches PE '5'. In another example, PE '8' is started first and in isolation of all other PE's, because it requires a significant amount of CPU to get going (e.g., heavy initialization costs, etc.). Otherwise, if the system starts PE '8' with all other PEs, the system becomes bogged down and tuples across various parts of the application are lost. Furthering this second example is that if everything is started at once, it can simply have adverse affects on the system as a whole. Accordingly, staggering the start of processing elements based on some resource requirement is desirable.

At block 208, the system determines a processing element restart order based at least in part on the processing requirements and computation capabilities. The system analyzes the overall PE graph. A PE graph is a flow of operators where data generally flows from left to right, where each operator performs some action on the data (e.g., filtering, aggregation, analytics, sink, etc.). For example, FIG. 1 shows a PE graph. The system utilizes the PE graph and historical information available from the PEs' run time in order to determine the optimal processing element restart time. The system intelligently generates a restart plan and performs PE restarts in such a way as to minimize data loss and application downtime. Embodiments also conserve system resources due to reduced dropped data.

In an example embodiment, if multiple PEs being restarted at the same time on the same computer node tend to slow down the computer node, the system may set the processing element restart order such that one PE or a limited number of PEs restart first on the same computer node. Other PEs on that same computer node may subsequently restart. The following are examples of a PE restart order that is based on the PE requirements and computation capabilities. In a first example embodiment, the system may restart PEs because the system gets bogged down. In another example embodiment, the system may restart PEs in a specific order simply to provide a mechanism that allows for PEs to function properly. For example, PE '5' may need initialization data from say PE '4'. To exemplify this aspect, consider the case where three PEs need to be started and all require a large amount of disk writing. If each PE is started independently, then a PE can start quickly as each disk write is a sub-millisecond. However, when they are all started at once, they may overload the drive being written to. Hence, each write now takes more than a second to perform. Note that the other running PEs may also use the same disk. Therefore, each PE trying to perform a disk write will be subsequently delayed. When delays occur in a streaming environment, suboptimal results may occur. For example, tuples may be lost because queuing occurs and the processing tuples are programmed to drop tuples in order to insure data is processed in real time. As such, interchanging any resource such as disk, CPU, memory, or any metric may have adverse affects on the system. Embodiments described herein minimize or eliminate such adverse affects.

At block 210, the system updates the subset of processing elements. In some embodiments, before updating the subset of processing elements, the system takes the subset of processing elements offline, and then updates the processing elements as needed.

In various embodiments, the system causes particular process elements to drop data based at least in part on a number of buffered tuples exceeding a buffer threshold. In some embodiments, the system determines a buffer threshold. The system then determines a number of buffered tuples. The system then determines if the number of buffered tuples exceeds the buffer threshold. The system then drops data based at least in part on the number of buffered tuples exceeding the buffer threshold. In various scenarios, there are different reasons the system may drop data and does not simply store the data in a buffer. For example, a first reason may be that there is a limited amount of memory to store data. A second reason may be that it is optimal to process data in real time or as close to real time as possible. At some point, processing old data provides no value. Each PE running in the system already has a buffering capability. In various scenarios, the programmer decides how big this buffer is. In some embodiments, when the buffer is full, the system simply drops the oldest tuple. This is all done to keep processes running in real time.

At block 212, the system restarts the subset of processing elements based at least in part on the processing element restart order. In various embodiments, the system restarts at least some of the processing elements of the subset of processing elements simultaneously based at least in part on the processing element restart order. In various embodiments, the system buffers one or more tuples of one or more process elements before dropping data. In various embodiments, the system enables the processing elements, which are not a part of the subset of processing elements that are updated, to remain in operation during the updating and restarting.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 3:
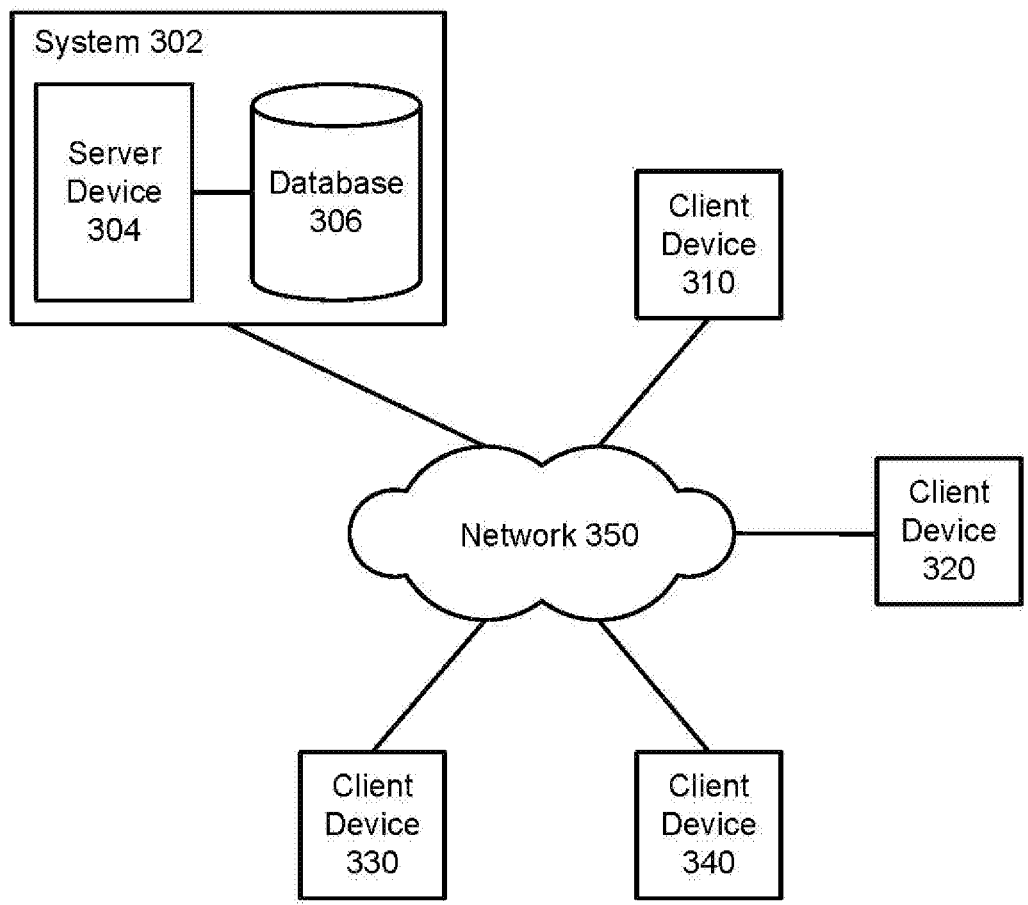
FIG. 3 is a block diagram of an example network environment, which may be used for some implementations described herein.

FIG. 3 is a block diagram of an example network environment 300, which may be used for some implementations described herein. In some implementations, network environment 300 includes a system 302, which includes a server device 304 and a database 306. Network environment 300 also includes client devices 310, 320, 330, and 340, which may communicate with each other directly or via system 302. The particular function of each of client devices 310-340 may vary, depending on the particular implementation. For example, in some embodiments, one or more of client devices 310-340 may provide users access to data provided by the system. In some embodiments, one or more of client devices 310-340 may provide data streams to the system. Network environment 300 also includes a network 350.

For ease of illustration, FIG. 3 shows one block for each of system 302, server device 304, and database 306, and shows four blocks for client devices 310, 320, 330, and 340. Blocks 302, 304, and 306 may represent multiple systems, server devices, and network databases. Also, there may be any number of client devices. In other implementations, network environment 300 may not have all of the components shown and/or may have other elements including other types of elements instead of, or in addition to, those shown herein. In various implementations, users may interact with each other or with system 302 using some of respective client devices 310, 320, 330, and 340.

In the various implementations described herein, a processor of system 302 and/or a processor of any client device 310, 320, 330, and 340 causes the elements described herein (e.g., information, etc.) to be displayed in a user interface on one or more display screens.

While server 302 performs embodiments described herein, in other embodiments, any suitable component or combination of components associated with server 302 or any suitable processor or processors associated with server 302 may facilitate performing the embodiments described herein. In various embodiments, environment 300 may not have all of the components shown and/or may have other elements including other types of components instead of, or in addition to, those shown herein.

Figure 4:
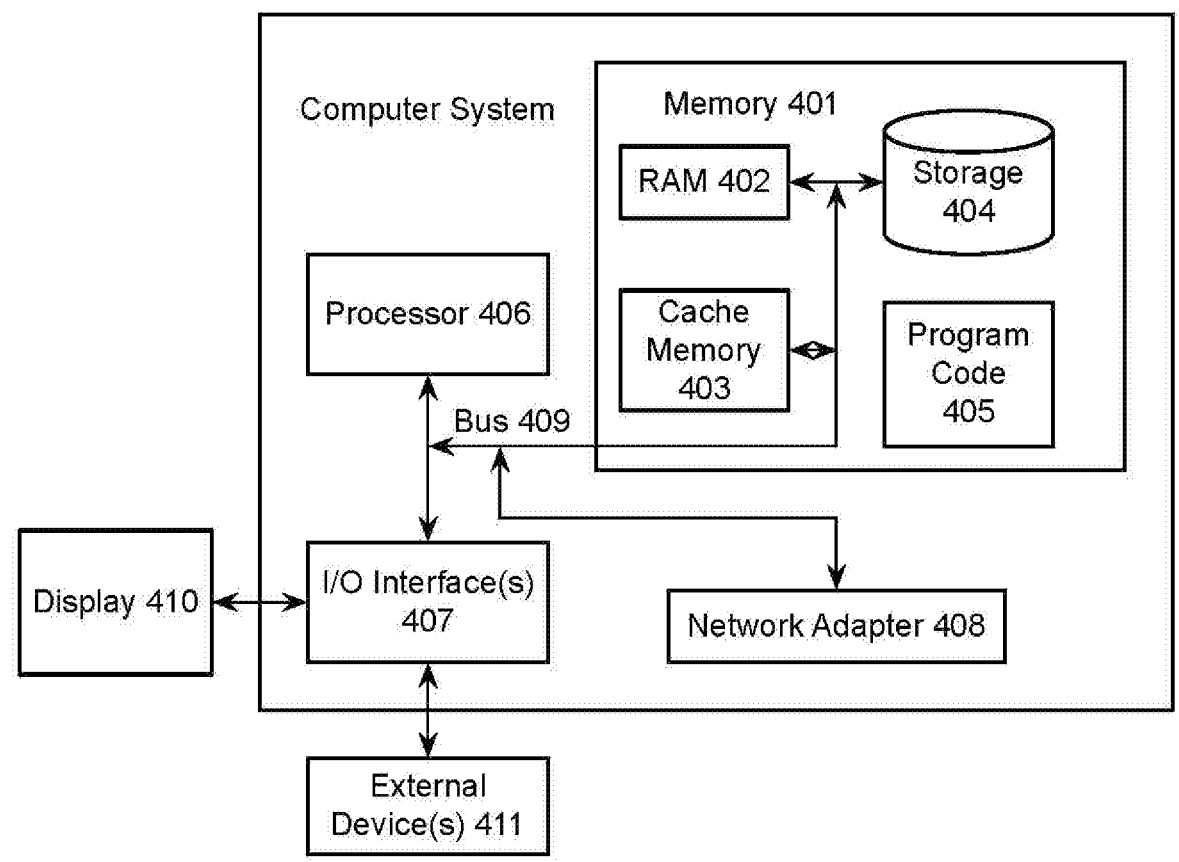
FIG. 4 is a block diagram of an example computer system, which may be used for embodiments described herein.

FIG. 4 is a block diagram of an example computer system 400, which may be used for embodiments described herein. The computer system 400 is operationally coupled to one or more processing units such as processor 406, a memory 401, and a bus 409 that couples various system components, including the memory 401 to the processor 406. The bus 409 represents one or more of any of several types of bus structure, including a memory bus or memory controller, a peripheral bus, an accelerated graphics port, and a processor or local bus using any of a variety of bus architectures. The memory 401 may include computer readable media in the form of volatile memory, such as random access memory (RAM) 402 or cache memory 403, or storage 404, which may include non-volatile storage media or other types of memory. The memory 401 may include at least one program product having a set of at least one program code module such as program code 405 that are configured to carry out the functions of embodiment of the present invention when executed by the processor 406. The computer system 400 may also communicate with a display 410 or one or more other external devices 411 via input/output (I/O) interfaces 407. The computer system 400 may communicate with one or more networks, such as communications network 110 via network adapter 408.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
    at least one processor and a computer-readable storage medium having program instructions embodied therewith, the program instructions executable by the at least one processor to cause the at least one processor to perform operations comprising:
    determining a job overlay, wherein the job overlay involves updates to a subset of processing elements of a plurality processing elements of a job;
    determining processing requirements of the plurality processing elements;
    determining computation capabilities of computational resources associated with the plurality of processing elements;
    determining a processing element restart order based at least in part on processing requirements and computation capabilities;
    updating the subset of processing elements;
    dropping data based at least in part on a number of buffered tuples exceeding a buffer threshold; and
    restarting the subset of processing elements based at least in part on the processing element restart order.

2. The system of claim 1, wherein the determining of the processing element restart order is based at least in part on historical performance metrics.

3. The system of claim 1, wherein the determining of the processing element restart order is based at least in part on historical decisions.

4. The system of claim 1, wherein the at least one processor further performs operations comprising restarting at least some of the processing elements of the subset of processing elements simultaneously based at least in part on the processing element restart order.

5. The system of claim 1, wherein the at least one processor further performs operations comprising buffering one or more tuples of one or more process elements before dropping data.

6. The system of claim 1, wherein the processing elements, which are not a part of the subset of processing elements that are updated, remain in operation during the updating and restarting.

7. A computer program product comprising a computer-readable storage medium having program instructions embodied therewith, the program instructions executable by at least one processor to cause the at least one processor to perform operations comprising:
    determining a job overlay, wherein the job overlay involves updates to a subset of processing elements of a plurality processing elements of a job;
    determining processing requirements of the plurality processing elements;
    determining computation capabilities of computational resources associated with the plurality of processing elements;
    determining a processing element restart order based at least in part on processing requirements and computation capabilities;
    updating the subset of processing elements;
    dropping data based at least in part on a number of buffered tuples exceeding a buffer threshold; and
    restarting the subset of processing elements based at least in part on the processing element restart order.

8. The computer program product of claim 7, wherein the determining of the processing element restart order is based at least in part on historical performance metrics.

9. The computer program product of claim 7, wherein the determining of the processing element restart order is based at least in part on historical decisions.

10. The computer program product of claim 7, wherein the at least one processor further performs operations comprising restarting at least some of the processing elements of the subset of processing elements simultaneously based at least in part on the processing element restart order.

11. The computer program product of claim 7, wherein the at least one processor further performs operations comprising buffering one or more tuples of one or more process elements before dropping data.

12. The computer program product of claim 7, the processing elements, which are not a part of the subset of processing elements that are updated, remain in operation during the updating and restarting.

13. A computer-implemented method for operating process elements in a job overlay environment, the method comprising:
    determining a job overlay, wherein the job overlay involves updates to a subset of processing elements of a plurality processing elements of a job;
    determining processing requirements of the plurality processing elements;
    determining computation capabilities of computational resources associated with the plurality of processing elements;
    determining a processing element restart order based at least in part on processing requirements and computation capabilities;
    updating the subset of processing elements;

dropping data based at least in part on a number of buffered tuples exceeding a buffer threshold; and restarting the subset of processing elements based at least in part on the processing element restart order.

14. The method of claim 13, wherein the determining of the processing element restart order is based at least in part on historical performance metrics.

15. The method of claim 13, wherein the determining of the processing element restart order is based at least in part on historical decisions.

16. The method of claim 13, further comprising restarting at least some of the processing elements of the subset of processing elements simultaneously based at least in part on the processing element restart order.

17. The method of claim 13, wherein the at least one processor further performs operations comprising buffering one or more tuples of one or more process elements before dropping data.

* * * * *